(12) United States Patent
Chen et al.

(10) Patent No.: US 9,852,203 B1
(45) Date of Patent: Dec. 26, 2017

(54) ASYNCHRONOUS DATA JOURNALING MODEL IN HYBRID CLOUD

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/354,262

(22) Filed: Nov. 17, 2016

(51) Int. Cl.
*G06F 17/30* (2006.01)
*G06F 9/455* (2006.01)
*H04L 29/08* (2006.01)

(52) U.S. Cl.
CPC .... *G06F 17/30578* (2013.01); *G06F 9/45558* (2013.01); *G06F 17/30368* (2013.01); *H04L 67/1095* (2013.01); *G06F 2009/45583* (2013.01); *G06F 2009/45595* (2013.01)

(58) Field of Classification Search
CPC .......... G06F 17/30578; G06F 9/45558; G06F 17/30368; G06F 2009/45583; G06F 2009/45595; H04L 67/1095
USPC ........................................ 707/614
See application file for complete search history.

(56) References Cited

U.S. PATENT DOCUMENTS

| | | | |
|---|---|---|---|
| 7,475,207 B2 | 1/2009 | Bromling et al. | |
| 7,634,507 B2 | 12/2009 | Atluri et al. | |
| 8,060,889 B2 | 11/2011 | Sim-Tang | |
| 8,700,574 B2 | 4/2014 | Thomson et al. | |
| 8,874,863 B2 | 10/2014 | Mutalik et al. | |
| 9,002,900 B2 | 4/2015 | Feinsmith | |
| 9,383,937 B1 | 7/2016 | Frank et al. | |
| 2011/0264786 A1* | 10/2011 | Kedem | H04L 41/12 709/223 |
| 2012/0054410 A1* | 3/2012 | Vaghani | G06F 3/064 711/6 |
| 2012/0151273 A1* | 6/2012 | Ben Or | G06F 9/45533 714/41 |
| 2014/0214915 A1* | 7/2014 | Dragon | H04L 43/04 709/201 |

OTHER PUBLICATIONS

Chidambaram, Vijay, Orderless and Eventually Durable File Systems, University of Wisconsin-Madison, 2015 (252 pages).
Malawski, Konrad, Async Akka-Persistence-HBase Journal, DZone Java, Jan. 9, 2014 (4 pages).
Shen et al., Journaling of Journal Is (Almost) Free, University of Rochester, 2014 (7 pages).

* cited by examiner

*Primary Examiner* — Evan Aspinwall
(74) *Attorney, Agent, or Firm* — K&L Gates LLP

(57) ABSTRACT

A system and method for scheduling of hyper-threaded CPUs using memory monitoring includes a memory with an operating system memory and a physical processor in communication with the memory. The physical processor includes a first hyper-thread and a second hyper-thread. A monitor instruction to monitor for updates to a designated memory location is executed in the first hyper-thread. The system further includes an operating system to execute on the physical processor and a system call configured to record in the operating system memory that the first hyper-thread is in a memory wait state. The system call is further configured to execute a memory wait instruction in the first hyper-thread. A task is executed in the second hyper-thread while the first hyper-thread is in the memory wait state.

17 Claims, 6 Drawing Sheets

ASYNCHRONOUS DATA JOURNALING MODEL IN HYBRID CLOUD

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on-demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of several deployment models, including private cloud, community cloud, public cloud, and hybrid cloud. Hybrid cloud may be a combination of private cloud and public cloud services, providing more flexibility and more data deployment options. For example, a business may store frequently used structured data in an on-premises private cloud, and other infrequently used data in a third-party public cloud.

Cloud infrastructure is a collection of hardware and software that implements the cloud computing model. Cloud infrastructure may be viewed as including a physical layer and an abstraction layer. The physical layer may include hardware resources designed to support the cloud services being provided, and typically includes server, storage, and network components. The abstraction layer may include the software deployed across the physical layer, which manifests the essential cloud characteristics. Conceptually, the abstraction layer resides above the physical layer. One type of IaaS is cloud storage. Cloud storage is a data storage service that provides storage to users in the form of a virtualized storage device over a network. Using cloud storage service, users may store, retrieve, maintain, and back up data remotely.

SUMMARY

The present disclosure provides new and innovative methods and systems for an asynchronous data journaling model in a hybrid cloud. An example method includes writing, by a virtual machine, block data to a journaling device of the virtual machine. The block data includes a journal record about a change in a database. A cloud includes the virtual machine, a hypervisor, and a cloud queueing service. The hypervisor converts the block data to a message. The cloud queueing service publishes the message.

Additional features and advantages of the disclosed methods and system are described in, and will be apparent from, the following Detailed Description and the Figures.

DETAILED DESCRIPTION OF EXAMPLE EMBODIMENTS

Figure 1:
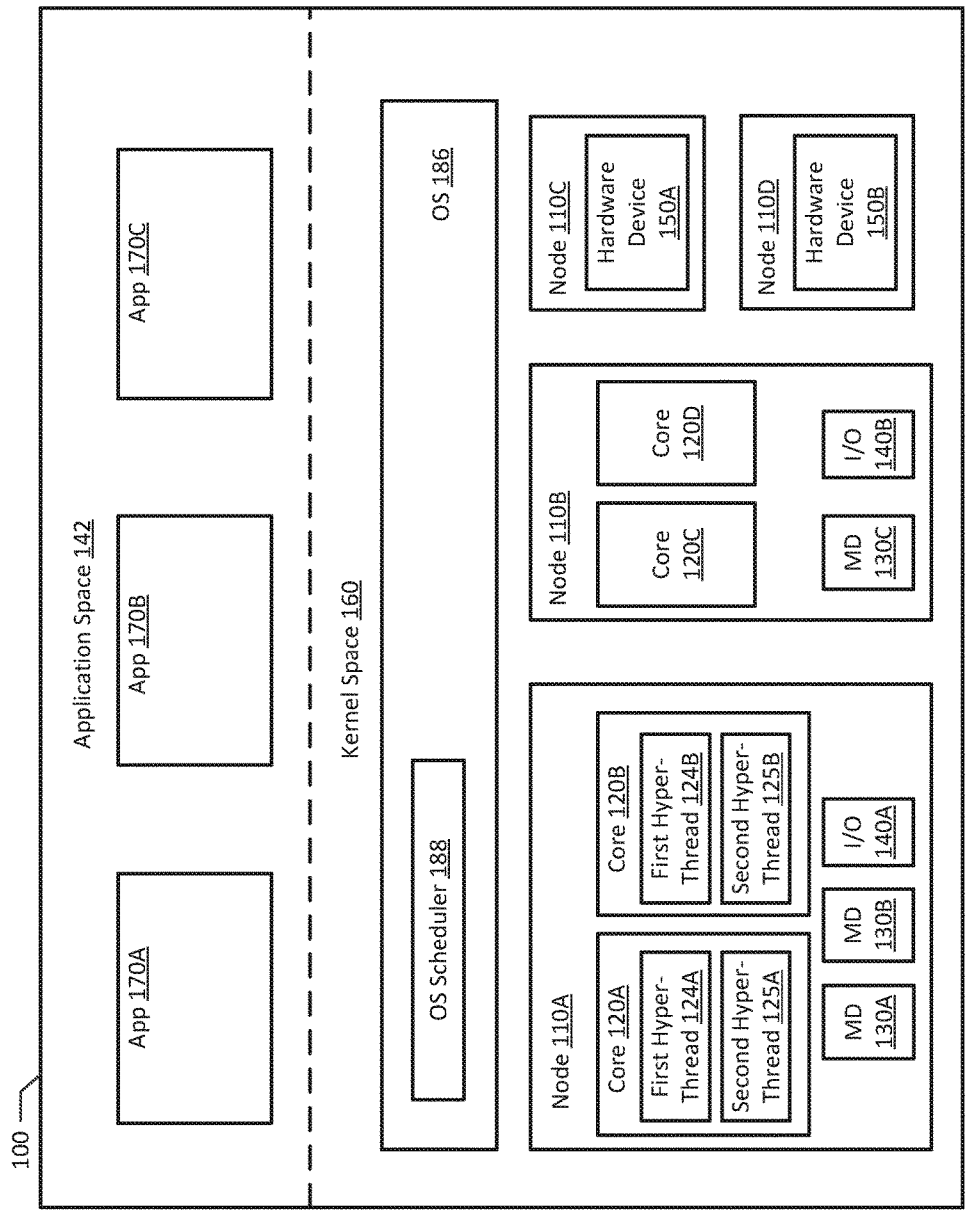
FIG. 1 is a block diagram of an example asynchronous data journaling cloud system according to an example of the present disclosure.

Described herein are methods and systems for an asynchronous data journaling model in hybrid cloud. In a cloud environment, persistent data services, such as Structured Query Language ("SQL") servers may need a journal device for a persistent transaction (e.g., persistent database updates) to ensure data availability. Journaling refers to a technique that records actions executed by a database system in a journal or a log. In the event of a system crash or power failure, the database system may look at the journal or log for transactions. The database system may roll back any changes made by uncommitted transactions. For transactions already committed, but not materialized in the database, the database system may re-apply the changes.

In a hybrid cloud (e.g., OpenStack®, Amazon Web Services™, Google Compute Engine™, Azure®), database instances may be replicated across multiple clouds. In conventional hybrid cloud systems, database journal devices may be mirrored using a distributed replicated block device ("DRBD") synchronously. However, synchronous block device mirroring not only slows down database transactions, but also is expensive to implement for the following reasons. First, active instances may be constantly running on each cloud to run the DRBD and to replicate data across the clouds synchronously. Second, conventional hybrid cloud systems using the DRBD may need to use a virtual network link to connect each active instances (e.g., between one virtual journaling device in one cloud and another virtual journaling device in another cloud), which may be slower than a physical network. Third, each cloud may need to expose a public IP address in the conventional system and only a fixed number of clouds may be able to replicate data in the synchronous replication model. Finally, a failed instance may lead to loss of database replica because in conventional hybrid cloud systems using the DRBD, journal history may not be maintained or accessed by clouds in the replica side at a later time.

Aspects of the present disclosure may advantageously address the above noted deficiency by providing an asynchronous data journaling cloud system supported by queueing services. For example, when detecting a change in a database, a virtual machine in a primary cloud (e.g., public cloud) may write block data (e.g., journal record) about the change to a journaling device. A hypervisor in the primary cloud may convert the block data to a message. The message may include the block data itself, encrypted block data, size of the block data, descriptions about how the block data is encrypted, location of the block data, timestamp, and/or encryption key. In an example, the hypervisor may send the message to a cloud storage. Then, a cloud queueing service in the primary cloud may retrieve the message from the cloud storage and publish the message. A subscriber in a secondary cloud (e.g., private cloud) may retrieve the message asynchronously. For example, the subscriber may pull the message at a predetermined periodic time interval. Then, a hypervisor in the secondary cloud may convert the message back to a block data (e.g., original journal record) and send the block data to a journaling device in the secondary cloud.

In this way, the journal records may be published as messages by another component in the primary cloud and the journaling device may be devoted to journaling. That is, the journaling device may not need to handle replication of data through a network, and this may help reduce latency in the primary cloud side. Furthermore, since the block data may be published by the queueing service after the block data is converted to a message by the hypervisor, and not replicated to a remote cloud directly from the journaling device as in conventional hybrid cloud systems, the present disclosure allows journal records to be replicated to other secondary clouds using a host OS's storage network instead of a virtual network, thus achieving high scalability and high bandwidth.

In the present disclosure, the journal records and messages may be saved in the cloud storage, and the cloud storage may keep the history of the journal records and messages. In a conventional hybrid cloud system using the DRBD, since writing to a journaling device (e.g., DRBD volume) may be immediately replicated to a journaling device in a remote cloud, the journal writer virtual machine may need to wait for acknowledgement before writing more data, for data integrity, which may slow down the system performance dramatically. However, in the present disclosure, the journal records and messages saved in the cloud storage may be searched or filtered by subscribers in secondary clouds at a later time. Therefore, the cloud system of the present disclosure may be capable of maintaining the data integrity without having to wait for acknowledgement from secondary clouds. This may allow replica instances (e.g., journal reader virtual machines in the secondary clouds) to restart and retrieve journal records from message queues saved in the cloud storage without losing journal integrity. Furthermore, this may also enable the messages (and ultimately the journal records) to be subscribed/received by any number of subscribers/clouds, unlike the conventional hybrid cloud system using the DRBD, where the journal records are replicated to a fixed number of clouds.

FIG. 1 depicts a high-level component diagram of an example asynchronous data journaling cloud system 100. As used herein, asynchronous data journaling may involve not replicating the journal record at the same time that the journal record is created or updated. The system 100 may include a primary cloud 110 and one or more secondary clouds 120A-C. As used herein, each cloud 110 or 120A-C may refer to a separate cloud region. The cloud region may be a geographical region where certain compute resources are located. In an example, the primary cloud 110 may include a database 120, a host machine 130, a queueing service 170, and a cloud storage 180. The database 120 may be in a database server, such as a SQL database server.

The host machine 130 may include one or more physical processors communicatively coupled to memory devices. As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. For example, host machine 130 may include processor 131, memory 132, and I/O 133. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network.

In an example, the host machine 130 may run one or more virtual machines (e.g., VM 150), by executing a software layer (e.g., hypervisor 140) above the hardware and below the virtual machines 150. In an example, the virtual machine 150 and the hypervisor 140 may be components of the host operating system 135 executed by the host machine 130. In another example, the hypervisor 140 may be provided by an application running on the operating system 135, or may run directly on the host machine 130 without an operating system beneath it. The hypervisor 140 may virtualize the physical layer, including processors, memory, I/O devices, hardware devices, and network interface controllers, and present this virtualization to virtual machines 150 as devices, including virtual processors, virtual memory devices, virtual I/O devices, and/or virtual devices.

In an example, the virtual machine 150 may include a (virtual) journaling/logging device 160. The journaling device 160 may be a block device. As used herein, a block device may refer to a data storage device, allowing random access to independent, fixed-sized blocks of data. In an example, the virtual machine 150 may be requested to create the journaling 160 device when a database instance is started.

In an example, the hypervisor 140 may include a cloud storage connector 145. The cloud storage connector 145 may be configured to connect the hypervisor 140 to the cloud storage 180 directly. Through the cloud storage connector, the hypervisor 140 may write data directly to the cloud storage 180. In an example, the hypervisor 140 may be a Quick Emulator (QEMU).

In an example, the queueing service 170 may be a virtual device. In an example, the queueing service 170 may be a virtual component of the host machine 130. In another example, the queueing service 170 may be separate from the host machine 130. In an example, the queueing service 170 may be a physical device. In an example, the queueing service 170 may be configured to receive one or more messages from the hypervisor 160 or the cloud storage 180 and publish messages queued in the queueing service 170.

In an example, the cloud storage 180 may be in the primary cloud 110. In another example, the cloud storage 180 may be located outside of the primary cloud 110. The cloud storage 180 may be accessed in any suitable manner. For example, the queueing service 170 may access the cloud storage 180 via an application program interface (API) or via a web server. In an example, the hypervisor 140 may directly access the cloud storage 180 by invoking an API.

In an example, the primary cloud 110 may be associated with one or more secondary clouds 120A-C. As discussed above, each cloud 110 or 120A-C may refer to a separate cloud region. For example, the primary cloud 110 may in one geographic region A (e.g., in Boston), and the secondary cloud 120A may be in another geographic region B (e.g., in Chicago). In an example, using a Master Selection Protocol, one or more clouds may be selected as the primary cloud and the remaining clouds may become secondary clouds. In an example, the primary cloud 110 may be a public cloud and the secondary cloud 120A may be a private cloud. In another example, the primary cloud 110 may be a private cloud and the secondary cloud 120A may be a public cloud. In an example, the secondary clouds 120A-C may be associated with each other. In an example, each secondary cloud (e.g., 120A-C) may include a subscriber (e.g., 122A-C), a database (e.g., 124A-C), and a journaling device (e.g., 126A-C). An example configuration of these secondary clouds 120A-C is described in greater detail below and as shown in FIG. 2.

Figure 2:
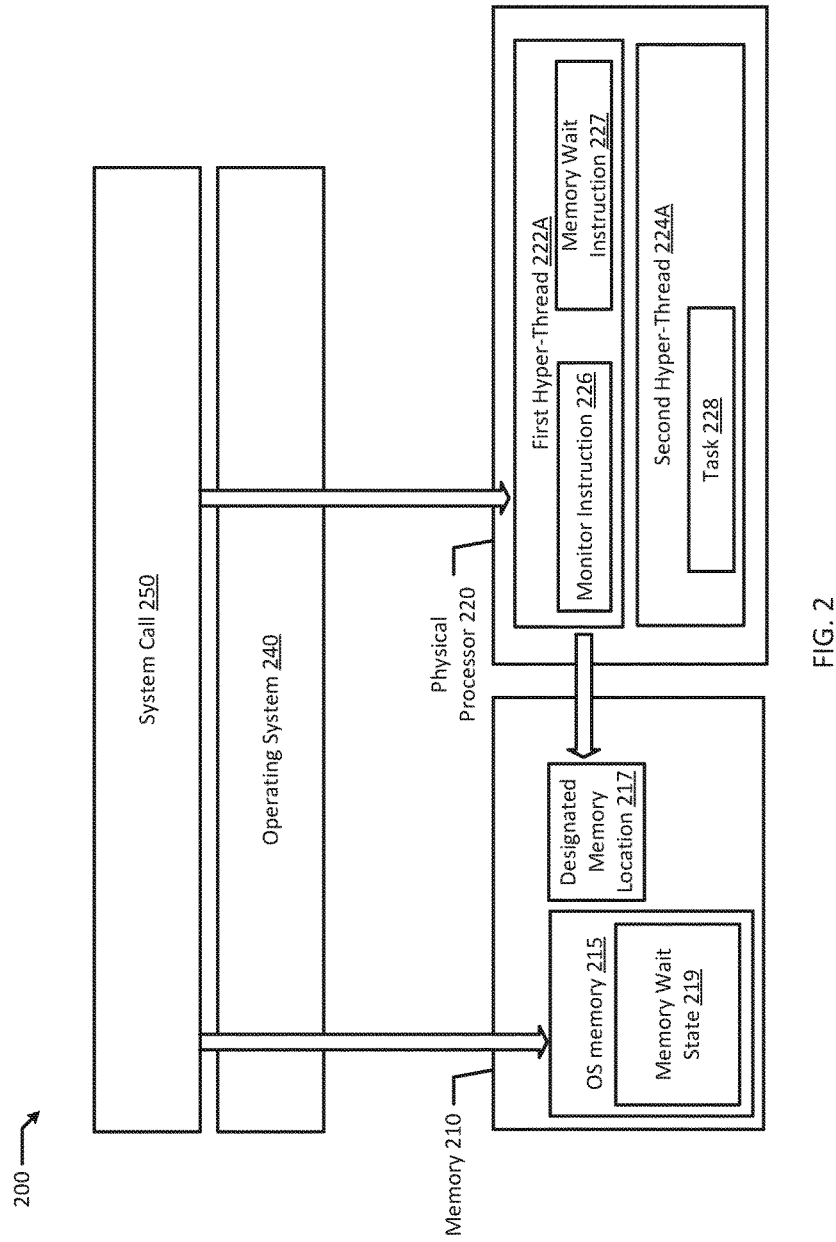
FIG. 2 is a block diagram of a secondary cloud according to an example of the present disclosure.

FIG. 2 illustrates a block diagram of a secondary cloud 200 according to an example of the present disclosure. In an example, the secondary cloud 200 may include a database 210, a subscriber 220, a host machine 230, and a queueing service 270. In an example, the secondary cloud may also include a cloud storage. The database 210 may be in a database server, such as a SQL database server.

The host machine 230 may include one or more physical processors communicatively coupled to memory devices. In an example, the host machine 230 may run one or more virtual machines (e.g., VM 250), by executing a software layer (e.g., hypervisor 240) above the hardware and below the virtual machines 250. In an example, the virtual machine 250 and the hypervisor 240 may be components of the host operating system 235 executed by the host machine 230. In another example, the hypervisor 240 may be provided by an application running on the operating system 235, or may run directly on the host machine 230 without an operating system beneath it. The hypervisor 240 may virtualize the physical layer, including processors, memory, I/O devices, hardware devices, and network interface controllers, and present this virtualization to virtual machines 250 as devices, including virtual processors, virtual memory devices, virtual I/O devices, and/or virtual devices. In an example, the virtual machine 250 may include a journaling/logging device 260. The journaling device 260 may be a block device. In an example, the virtual machine 250 may be requested to create the journaling device 260 when a database instance is started.

In an example, the subscriber 220 may be a library of the host machine 230. The subscriber 220 may be configured to communicate with the message publisher (e.g., queueing service 170) to determine which message queue can be downloaded and retrieve messages published from the message publisher. In an example, the subscriber 220 may be a virtual component in the host machine 230 or any other servers in the secondary cloud 200. In an example, the subscriber 220 may be a physical device. In an example, the subscriber 220 may be configured to send one or more messages received from the message publisher to the hypervisor 240.

In an example, the secondary cloud 200 may also include the queueing service 270. When there is a change to the database 210 in the secondary cloud 200, the queueing service 270 may publish messages about the change. For example, if a user in a secondary cloud region (e.g., Chicago) modifies a database 124A, the secondary cloud 120A may start acting as primary and the queueing service 270 may publish messages about the changes made in the database 124A so that the primary cloud 110 and other secondary clouds 120B-C can pull the messages. In this case, the primary cloud 110 may also include a subscriber to receive the messages. In another example, the secondary cloud 120A may just report the database changes made by a local user (e.g., private cloud user in Chicago) to the primary cloud 110 (e.g., public cloud in Boston), and the primary cloud 110 may publish messages about the changes to the secondary clouds (e.g., 120A-C).

The queueing service 270 may be a virtual device. In an example, the queueing service 270 may be a virtual component of the host machine 230. In another example, the queueing service 270 may be separate from the host machine 230. In an example, the queueing service 270 may be a physical device. In an example, the queueing service 270 may be configured to receive one or more messages from the hypervisor 240 or a cloud storage (not shown) and publish messages queued in the queueing service 270.

Figure 3:
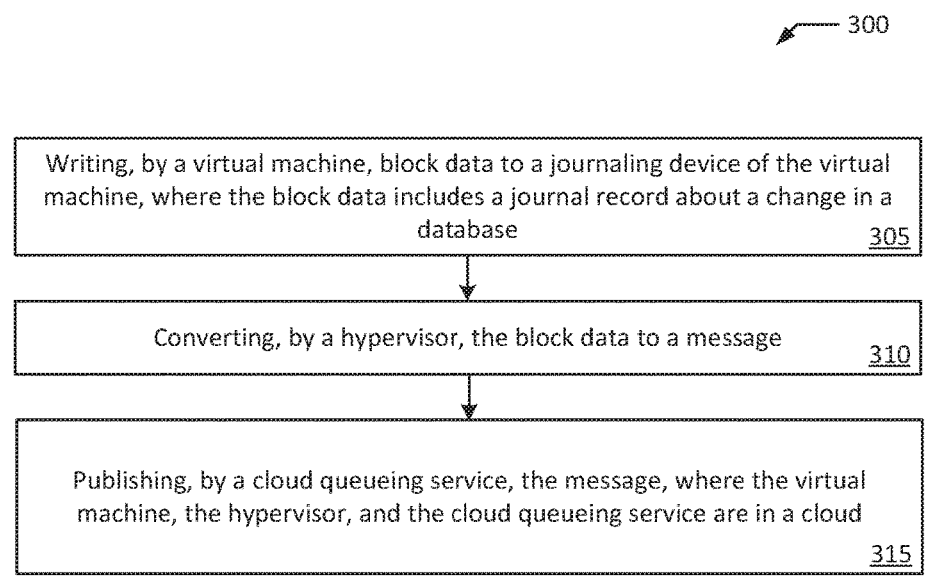
FIG. 3 is a flowchart illustrating an example method of operating an asynchronous data journaling cloud system according to an example of the present disclosure.

FIG. 3 shows a flowchart of an example method 300 for asynchronous data journaling in hybrid cloud according to an example of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a virtual machine may write block data to a journaling device of the virtual machine, where the block data may include a journal record about a change in a database (block 305). For example, the virtual machine 150 may write block data to the journaling device 160 and the block data may include a journal record about a change in the database 120. In an example, the journal record may include both stored data and related metadata. In another example, the journal record may include only the metadata. Examples of metadata may include any information related to the data stored in the database, such as author, file size, date created, date last accessed, and/or date last modified. In an example, any actions taken by the database (e.g., even read access) may be tracked by the journaling device.

Then, a hypervisor may convert the block data to a message (block 310). For example, the hypervisor 140 may convert the block data to a message. For example, converting the block data may include encrypting the block data or various forms of formatting or manipulating the block data. Then, a cloud queueing service may publish the message, where the virtual machine, the hypervisor, and the cloud queueing service may be in a cloud (block 315). For example, the cloud queueing service 170 may publish the message about the changes in the database 120, and the virtual machine 150, the hypervisor 140, and the cloud queueing service 170 may be in the same cloud, namely, primary cloud 110.

Figure 4A:
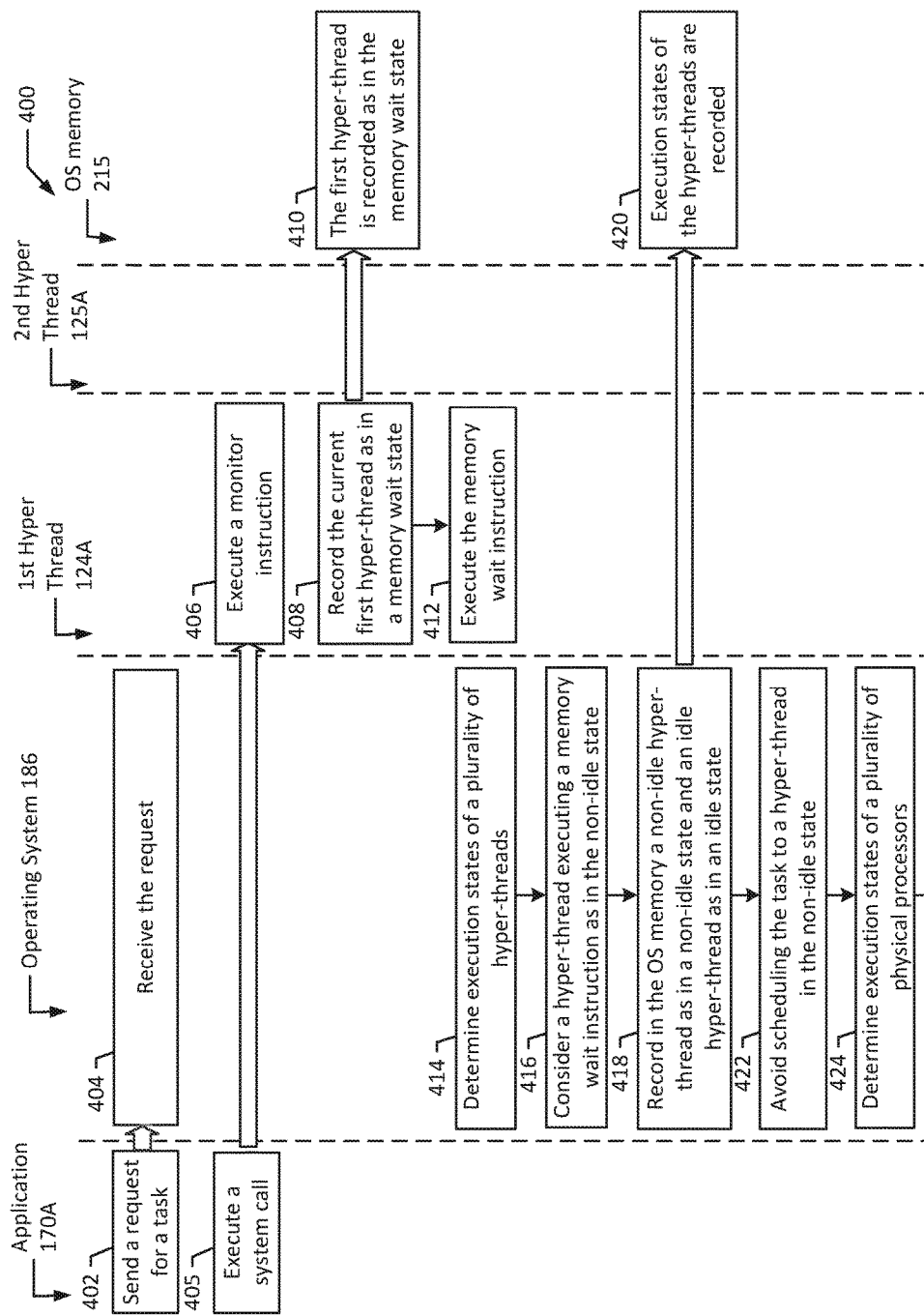
FIGS. 4A and 4B illustrate a flow diagram illustrating example methods of operating an asynchronous data journaling cloud system according to examples of the present disclosure.
Figure 4B:
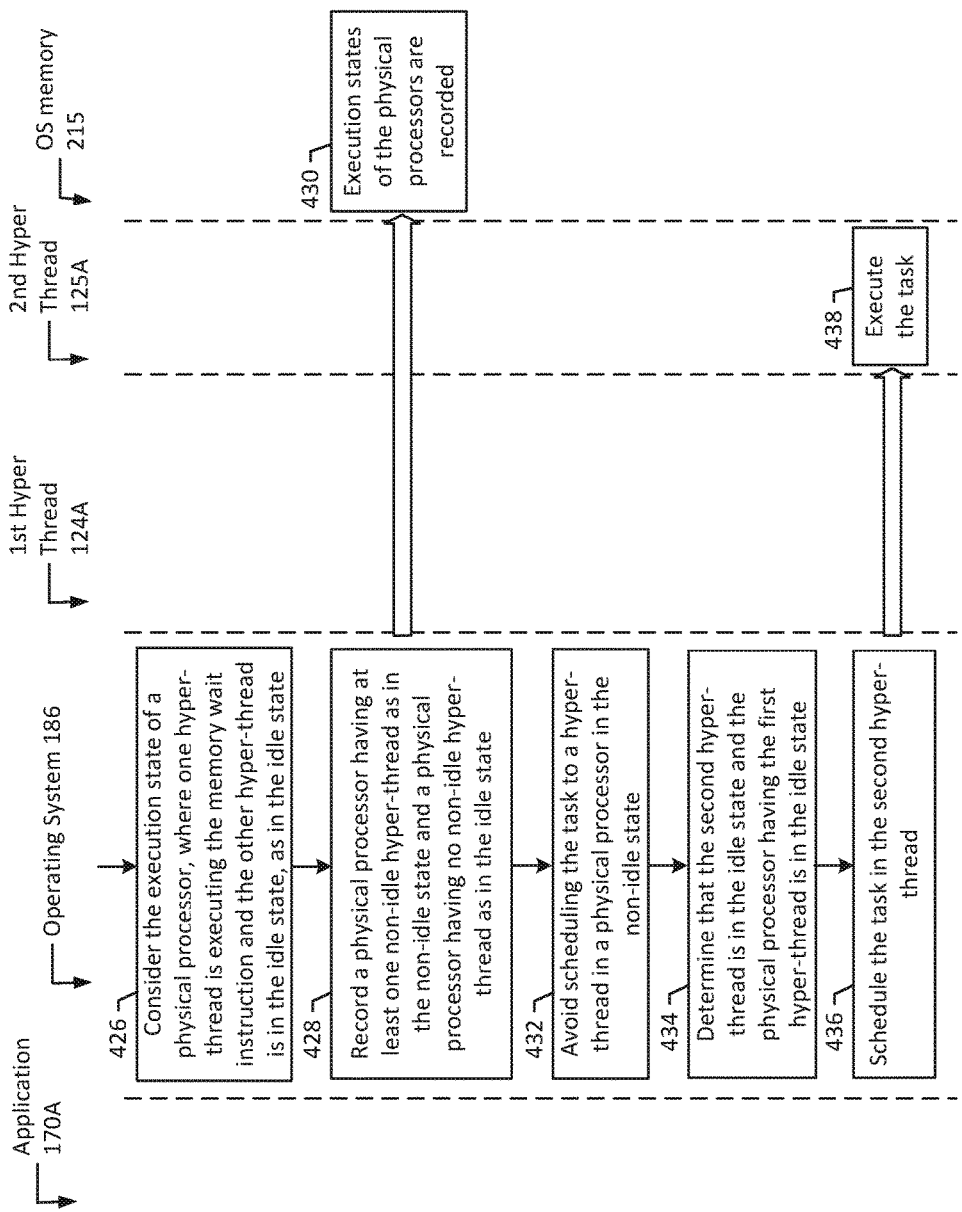

FIGS. 4A and 4B illustrate flow diagrams of an example method 400 for asynchronous data journaling in hybrid cloud according to an example of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including virtual machine 150, first journaling device 160, first hypervisor 140, cloud queueing service 170, cloud storage 180, subscriber 220, second hypervisor 240, and second journaling device 260 communicating or interacting with each other.

In the illustrated example, the virtual machine 150 in a cloud 110 may create a journaling device 160 when a database is started (blocks 402 & 404). For example, when a database instance is started, the virtual machine 150 may be requested to create a journaling device 160 in the virtual machine 150. When detecting a change in the database 120 (block 406), the virtual machine 150 may write first block data, which includes a journal record about the change, to the journaling device 160 (blocks 408 & 410). Then, the first hypervisor 140 may convert the first block data to a message (block 412). In an example, the hypervisor 140 may convert any block data written in the journaling device 160 to a message. In this way, any operations (e.g., read or write access) taken by the database 120 may become a message publishable by the queueing service 170. In an example, the message may include block data itself (e.g., stored data or metadata), size of the block data, location of the block data, timestamp, and/or any information related to the block data. In an example, the hypervisor 140 may encrypt the block data when converting the block data to the message. In this case, the message may also include the encrypted block data, descriptions about how the block data is encrypted, and/or encryption key.

In an example, some of the information in the message (e.g., size of the block data, timestamp, location of the block data) may be used to check whether the block data delivered from the primary cloud (e.g., 110) to the secondary cloud (e.g., 120A) as a message is not corrupted. In an example, the cloud system may use a checksum to count the number of bits in a transmitted block data or message so that the subscriber can check whether the same number of bits arrived.

In an example, the hypervisor 140 may send the message to the cloud storage 180 (block 414). For example, the hypervisor 140 may send the message to the cloud storage 180 by invoking an API. Then, the cloud storage 180 may store the message in the cloud storage (block 416). The cloud queueing service 170 may retrieve the message from the cloud storage before publishing the message (block 418). Then, the cloud queueing service 170 may publish the message (block 420). In an example, the cloud queueing service 170 may not publish the message unless the number of messages queued in the cloud queueing service 170 is equal or greater than a predetermined threshold value (e.g., 1, 5, 10, 100).

In another example, the hypervisor 140 may send the converted message directly to the cloud queueing service 170. Then, the cloud queueing service 170 may publish the message. In an example, the cloud queueing service 170 may store the message received from the hypervisor 140 in the cloud storage 180 before or after publishing the message.

The cloud queueing service 170 may send a notification to one or more subscribers 220 that the message is available (block 422). Then, the subscriber 220 in a second cloud (e.g., 120A or 200) may receive the notification (block 424). In an example, the subscriber 220 may poll the cloud queueing service 170 to check whether there are any messages to receive from the cloud queueing service 170 (block 426). In an example, the subscriber 220 may count the number of messages queued in the queueing service 170 or determine which message to retrieve from the queueing service 170. Then, the subscriber 220 may receive/pull the message from the cloud queueing service 170 (block 428). In an example, the subscriber 220 may receive the message when the message is related to data for which a read or write operation request is submitted by a user of the second cloud 200. In another example, the subscriber 220 may receive the message at a predetermined periodic time interval (e.g., every millisecond, every second, every minute, every 10 minutes, every hour, every day). For example, the subscriber 220 may poll the cloud queueing service 170 and retrieve available messages at a predetermined periodic time interval. In an example, there may be a time window that the subscriber 220 can poll and retrieve the messages queued in the queueing service 170. For example, if the time window is three or four days, the subscriber 220 may be able to poll and retrieve messages queued in the queueing service 170 for the last three or four days.

In another example, instead of polling the cloud queueing service 170, the cloud queueing service 170 may push messages to the subscriber 220 whenever any messages become available. In an example, the cloud queueing service 170 may push the messages to the subscriber 220 at a predetermined periodic time interval. In another example, the cloud queueing service 170 may push the messages to the subscriber 220 when the number of messages queued in the cloud queueing service 170 is equal or greater than a predetermined threshold value (e.g., 1, 5, 10, 100).

In an example, a second subscriber (e.g., 122B) in a third cloud (e.g., 120B), may receive the message asynchronously at a second predetermined periodic time interval. In an example, the second predetermined periodic time interval may be different from the predetermined periodic time interval of the first subscriber (e.g., 122A) in a second cloud (e.g., 120A). In another example, the second predetermined periodic time interval may be the same as the predetermined periodic time interval of the first subscriber (e.g., 122A) in the second cloud (e.g., 120A).

After the subscriber 220 receives the message, the second hypervisor 240 in the second cloud 200 may convert the message to second block data (block 430). In an example, the second hypervisor 240 may decrypt any encrypted data in the message while converting the message to the second block data. For example, the second hypervisor 240 may decrypt the message to generate the second block data. The second hypervisor 240 may send the second block data to a second journaling device 260 in the second cloud 200 (block 432). After receiving the second block data (block 434), the second journaling device 260 may store the second block data in its buffer (block 436). The second journaling device buffer may refer to a device buffer associated with the second journaling device 260. This device buffer may be a temporary space that stores data being transferred from the hypervisor 240 to the second journaling device 260. In an example, the second journaling device buffer may be stored in memory, allocated to the second virtual machine 250, that is used for storing block data (e.g., a buffered I/O case). The buffers may be flushed into the second journaling device 260 later. In another example, the second journaling device buffer may be written to the second journaling device 260 directly without storing the buffer anywhere else first (e.g., a direct I/O case). In an example, the second block data may be the same as the first block data. That is, the second block data may include the same journal records as the first block data.

In an example, the cloud storage 180 may include a message history that allows the journal record to be searchable. For example, the message history may include any information about messages published by the queueing service 170, such as message published date, message saved data, or any information about the block data in the messages. In an example, the message history may be searched by author, file size, message/block-data created date, message/block-data last accessed date, block-data last modified date, or message published date. In an example, the queueing service 170 may record the message history. In another example, the hypervisor 140 or any other processor component may record the message history.

In an example, the subscriber 220 may send a request to the cloud queueing service 170 to search for a message history, for example, for a missing update (block 438). For example, in the event of a system crash or power failure, the subscriber 220 may send such request to the cloud queueing service 170 to re-apply the missing updates in the second cloud. Then, the cloud queueing service 170 may search the cloud storage 180 for the message history (block 440). When a search result is returned from the cloud storage (block 442), the cloud queueing service 170 may send the search result to the subscriber 220 (block 445). Based on the search result, the subscriber 220 may determine which messages are related to the missing update and pull the messages related to the missing update (block 446). The retrieved messages may be converted by the hypervisor 240 and saved in the journaling device 260, as described in blocks 430-436.

In an example, the virtual machine 150 may write third block data to the first journaling device 160, for example, when there is another change in the database 120. Then, the hypervisor 140 may convert the third block data to a second message. Then, the cloud queueing service 170 may publish the second message when the number of messages queued in the cloud queueing service 170 is equal or greater than a predetermined threshold value (e.g., 1, 5, 10, 100).

Figure 5:
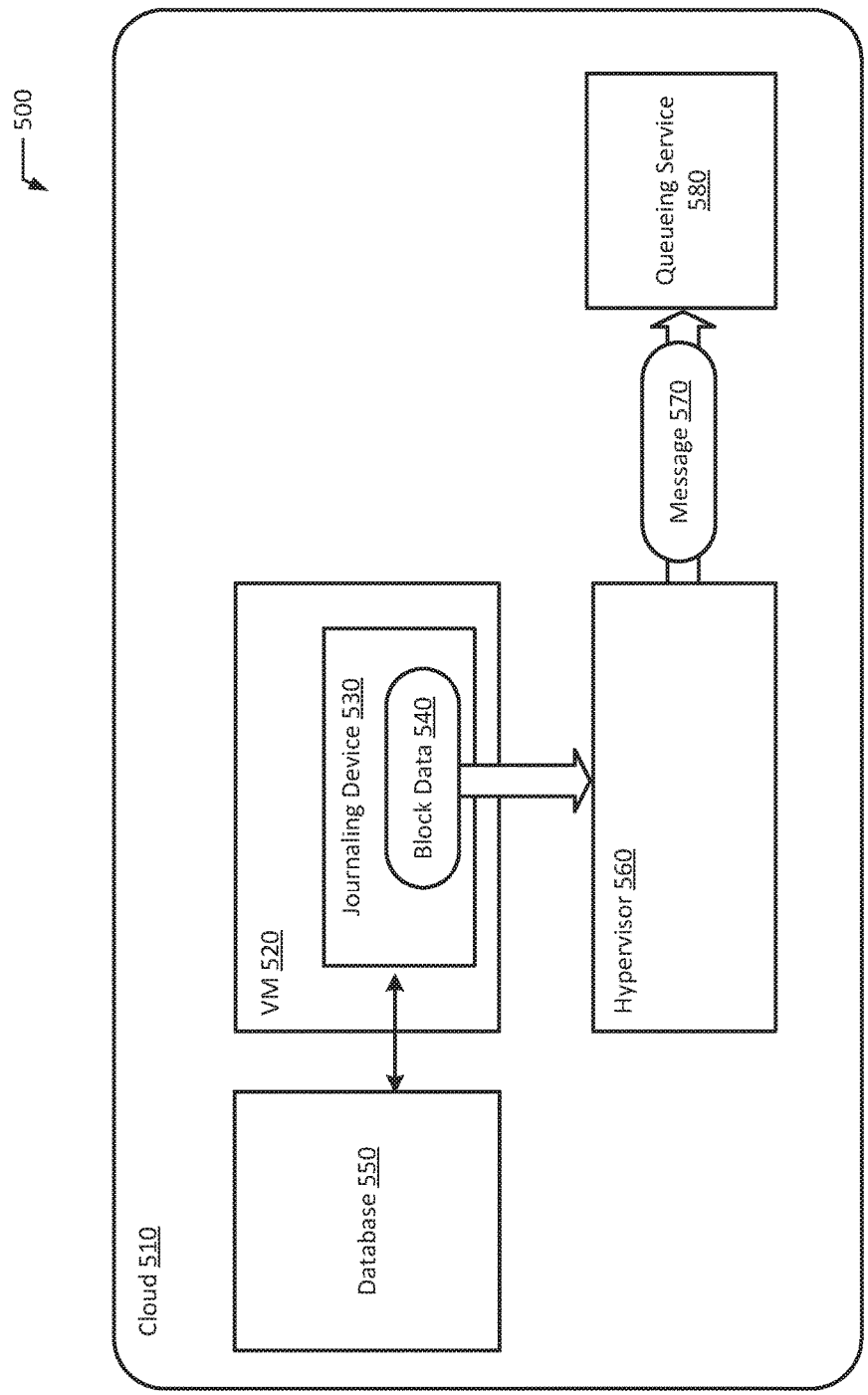
FIG. 5 is a block diagram of an example asynchronous data journaling cloud system according to an example of the present disclosure.

FIG. 5 shows a block diagram of an example asynchronous data journaling cloud system 500 according to an example of the present disclosure. As illustrated in FIG. 5, an example system 500 may include a virtual machine 520 and a journaling device 530 in the virtual machine 520. The virtual machine 520 may write block data 540 to the journaling device 530. The block data 540 may include a journal record about a change in a database 550. The system 500 may include a hypervisor 560 to covert the block data 540 to a message 570. The system 500 may also include a cloud queueing service 580 to publish the message 570. The virtual machine 520, the hypervisor 560, and the cloud queueing service 580 may be in a cloud 510.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

The terminology used herein is intended to describe particular embodiments only and is not intended to be limiting of the present disclosure. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for block device mirroring in a hybrid cloud, the method comprising:
   writing, by a first virtual machine, first block data to a first journaling device of the first virtual machine, wherein the first block data includes a journal record about a change in a database;
   converting, by a first hypervisor, the first block data to a message, wherein converting the first block data includes encrypting the first block data;
   publishing, by a cloud queueing service, the message asynchronously through a network of a host operating system in a public cloud, wherein the first virtual machine, the first hypervisor, and the cloud queueing service are in the public cloud, wherein the message includes the encrypted first block data;
   receiving, by a subscriber in a private cloud, the message published by the cloud queueing service asynchronously;
   converting, by a second hypervisor in the private cloud, the message to second block data; and
   sending, by the second hypervisor, the second block data to a second journaling device in a second virtual machine, wherein the second virtual machine is in the private cloud.

2. The method of claim 1, further comprising sending, by the first hypervisor, the message to the cloud quicuing service.

3. The method of claim 1, further comprising:
   sending, by the first hypervisor, the message to a cloud storage; and
   retrieving, by the cloud queueing service, the message from the cloud storage before publishing.

4. The method of claim 3, wherein the cloud storage includes a message history that allows the journal record to be searchable.

5. The method of claim 1, further comprising polling, by the subscriber, the cloud queueing service, to check whether there are any messages to receive from the cloud queueing service.

6. The method of claim 1, further comprising:
sending, by the subscriber, a request to the cloud queueing service to search for a message history; and
responsive to receiving the request, searching, by the cloud queueing service, the message history stored in a cloud storage.

7. The method of claim 1, further comprising sending, by the cloud queuing service, a notification to the subscriber that the message is available for the subscriber.

8. The method of claim 1, wherein the first block data is the same as the second block data.

9. The method of claim 1, wherein the subscriber receives the message when the message is related to data for which a read or write operation request is submitted by a user of the private cloud.

10. The method of claim 1, wherein the subscriber receives the message at a first predetermined periodic time interval.

11. The method of claim 10, further comprising receiving, by a second subscriber in a second private cloud, the message asynchronously at a second predetermined periodic time interval, wherein the second predetermined periodic time interval is different from the first predetermined periodic time interval.

12. The method of claim 1, further comprising:
writing, by the first virtual machine, third block data to the first journaling device;
converting, by the first hypervisor, the third block data to a second message; and
publishing, by the cloud queueing service, the second message when the number of messages queued in the cloud queueing service is equal or greater than a predetermined value.

13. A cloud system for block device mirroring in a hybrid cloud, the system comprising:
a first virtual machine;
a first journaling device in the first virtual machine, wherein the first virtual machine writes first block data to the first journaling device, wherein the first block data includes a journal record about a change in a database;
a first hypervisor to covert the first block data to a message, wherein converting the first block data includes encrypting the first block data;
a cloud queueing service to publish the message asynchronously through a network of a host operating system in a public cloud, wherein the first virtual machine, the first hypervisor, and the cloud queueing service are in the public cloud, wherein the message includes the encrypted first block data;
a subscriber to receive the message published by the cloud queueing service asynchronously;
a second hypervisor to convert the message to second block data;
a second virtual machine; and
a second journaling device in the second virtual machine, wherein the second hypervisor sends the second block data to the second journaling device, wherein the subscriber, the second hypervisor, and the second virtual machine are in a private cloud.

14. The cloud system of claim 13, wherein the first hypervisor sends the message to the cloud queuing service.

15. The cloud system of claim 13, wherein the first hypervisor sends the message to a cloud storage, and the cloud queueing service retrieves the message from the cloud storage before publishing.

16. The cloud system of claim 15, wherein the cloud storage includes a message history that allows the journal record to be searchable.

17. A non-transitory computer readable medium for block device mirroring in a hybrid cloud, the non-transitory computer readable medium including instructions that, when executed, causes one or more processors to:
write, by a first virtual machine, first block data to a first journaling device of the first virtual machine, wherein the first block data includes a journal record about a change in a database;
convert, by a first hypervisor, the first block data to a message, wherein converting the first block data includes encrypting the first block data;
publish, by cloud queueing service, the message asynchronously through a network of a host operating system in a public cloud, wherein the first virtual machine, the first hypervisor, and the cloud queueing service are in the public cloud, wherein the message includes the encrypted first block data;
receive, by a subscriber in a private cloud, the message published by the cloud queueing service asynchronously;
convert, by a second hypervisor in the private cloud, the message to second block data; and
send, by the second hypervisor, the second block data to a second journaling device in a second virtual machine, wherein the second virtual machine is in the private cloud.

* * * * *